United States Patent [19]

Nakane et al.

[11] Patent Number: 4,927,895

[45] Date of Patent: May 22, 1990

[54] SILICON-CONTAINING COPOLYESTER AND METHOD OF PRODUCING THE SAME

[75] Inventors: Toshio Nakane; Kenji Hijikata; Yukihiko Kageyama; Katsuhiko Takahashi, all of Shizuoka, Japan

[73] Assignee: Polyplastics Co., Ltd., Osaka, Japan

[21] Appl. No.: 263,698

[22] Filed: Oct. 28, 1988

Related U.S. Application Data

[63] Continuation-in-part of Ser. No. 121,263, Nov. 16, 1987, abandoned.

[30] Foreign Application Priority Data

May 28, 1988 [JP] Japan ................................ 61-273518

[51] Int. Cl.$^5$ .............................................. C08F 20/00
[52] U.S. Cl. .................................... 525/438; 525/446; 528/26; 528/38; 528/29
[58] Field of Search ................... 525/446, 438; 528/26, 528/38, 29

[56] References Cited

U.S. PATENT DOCUMENTS

| | | | |
|---|---|---|---|
| 3,701,815 | 10/1972 | Matzner et al. | 525/446 |
| 3,861,915 | 1/1975 | Cawley | 525/446 |
| 3,935,154 | 1/1976 | Cawley | 260/33.8 |
| 4,348,510 | 9/1982 | Keck et al. | 525/446 |
| 4,496,704 | 1/1985 | Ginnings | 528/26 |
| 4,613,641 | 9/1986 | Haubennestel et al. | 524/267 |
| 4,640,962 | 2/1987 | Ostrozynski | 525/474 |
| 4,659,786 | 4/1987 | Kawakami et al. | 525/415 |
| 4,699,967 | 10/1987 | Eichenauer et al. | 525/446 |
| 4,758,637 | 7/1988 | Merrifield et al. | 525/474 |
| 4,766,181 | 8/1988 | Ostrozynski et al. | 525/474 |

FOREIGN PATENT DOCUMENTS

| | | |
|---|---|---|
| 1017483 | 9/1977 | Canada . |
| 0174713 | 3/1986 | European Pat. Off. . |
| 0214658 | 3/1987 | European Pat. Off. . |
| 1288361 | 9/1972 | United Kingdom . |
| 2170814 | 8/1986 | United Kingdom . |

*Primary Examiner*—Melvyn I. Marquis
*Attorney, Agent, or Firm*—Nixon & Vanderhye

[57] ABSTRACT

Silicon-containing copolyester are in the form of a block copolymers comprising, (i) between about 1 to 99% by weight of a siloxane segment which is at least one selected from the group consisting of siloxane segments expressed by the following general formulas;

$$-CH_2-\underset{OH}{CH}-R\underset{\underset{CH_3}{|}}{+}SiO\underset{\underset{CH_3}{|}}{)_{m}}Si-R-\underset{OH}{CH}-CH_2-$$

and $$-CH_2-\underset{OH}{CH}-R'-O-R\underset{\underset{CH_3}{|}}{+}SiO\underset{\underset{CH_3}{|}}{)_{m}}Si-R-O-R'-\underset{OH}{CH}-CH_2-$$

where R and R', which may be the same or different, are each hydrocarbon moieties having 1 to 10 carbon atoms, and m is an integer between 1 to 2000; and (ii) between about 99 to about 1% by weight of a polyester segment which is at least one selected from polyester segments of the following general formulas:

$$-(\underset{}{\overset{O}{\overset{\|}{C}}}-R_1-\underset{}{\overset{O}{\overset{\|}{C}}}-O-R_2-O)_n-$$

and $$-(\underset{}{\overset{O}{\overset{\|}{C}}}-R_1-O-\underset{}{\overset{O}{\overset{\|}{C}}}-R_2-O)_n-$$

where $R_1$ is at least one radical selected from the group consisting of aromatic bivalent radicals having 6 to 12 carbon atoms and aliphatic bivalent radicals having 4 to 20 carbon atoms, $R_2$ is at least one radical selected from the group consisting of aromatic bivalent radicals having 6 to 20 carbon atoms, and aliphatic bivalent radicals having 2 to 20 carbon atoms, and n is an integer between 1 and 1000. The block copolymers are advantageously prepared by reacting a polyester with a silicon oil having terminal reactive epoxy moieties.

14 Claims, No Drawings

SILICON-CONTAINING COPOLYESTER AND METHOD OF PRODUCING THE SAME

RELATED APPLICATIONS

This application is a continuation-in-part of application Ser. No. 07/121,263 filed Nov. 16, 1987, now abandoned, in the name of the same applicants of this application and entitled "Silicon-Containing Copolyester and Method of Producing Same", the entire content of this copending U.S. application being expressly incorporated hereinto by reference.

FIELD OF INVENTION

This invention relates to copolymers having excellent resistance to impact shock and hydrolysis. More specifically, the present invention relates to novel silicon-containing polyester copolymers, and to methods of producing the same.

BACKGROUND AND SUMMARY OF THE INVENTION

Thermoplastic polyester resins are widely used in the manufacture of various kinds of constructional materials due to their excellent mechanical strength characteristics, such as tensile strength, tear strength, impact resilience, freeze resistance, and flex resistance.

Because of their excellent mechanical strength characteristics, these resins are being used for components exposed to severe environmental conditions. However, under such sever environmental conditions thermoplastic polyesters tend to exhibit poor resistance to hydrolysis. And, thermoplastic polyesters usually do not offer adequate impact shock resistance when exposed to low temperature environments. There have been various attempts to improve or modify thermoplastic polyesters so as to overcome their inadequate resistance to hydrolysis and/or impact shock. These prior attempts usually include compounding polyester with other resins whose physical attributes overcome such disadvantages, or chemical modification of the polyester.

One attempt to improve the physical attributes of polyester in extreme environmental conditions involves compounding polyester with a more "elastic" resin (e.g., so-called elastic polymer loading), typical examples of which include SBR, BN and olefin elastomers. There have also been other attempts involving compounding of polyester with a resin having enhanced interfacial bonding with the polyester matrix. For example, it has been proposed in Japan Published Application Nos. 61-60744 and 61-60756 to introduce a glycidyl group into an olefin polymer for use as a modifier resin in a polyester resin matrix. Furthermore, Japan Patent Publication No. 61-42561 suggests that a carboxylic group may be introduced into an olefin polymer so as to improve its bonding capability with a polyester matrix. However, these prior attempts have not been successful due principally to the inadequate interfacial reactivity that is provided by means of the modifier resins.

Attempts to improve polyester resin characteristics through chemical modification have typically focussed upon the intramolecular introduction of an elastic segment into the polyester chain. However, such a technique is disadvantageous since intramolecular plasticization usually occurs with the result that the intrinsic mechanical strength characteristics of the resin are significantly sacrificed.

The present invention is therefore directed towards novel polyester resins which overcome the disadvantages of the prior attempts at achieving improved resin performance in extreme environmental conditions. According to the present invention, specific soft siloxane segments are introduced into the polyester polymer through covalent linkage. The resulting polyester copolymer exhibits good resistance to impact shock and to hydrolysis without any loss of the inherent advantageous properties of the base polyester resin.

DETAILED DESCRIPTION OF THE INVENTION

Broadly, the invention provides a silicon-containing copolyester in the form of a block copolymer comprising, (i) between about 1 to 99% by weight of a siloxane segment which is at least one selected from the group consisting of siloxane segments expressed by the following general formulas:

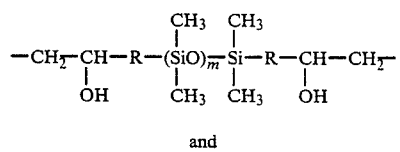

and

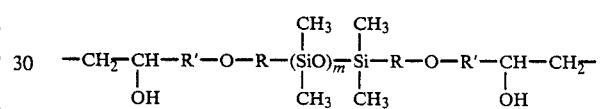

where R and R', which may be the same or different, are each hydrocarbon moieties having 1 to 10 carbon atoms, and m is an integer between 1 to 2000; and (ii) between about 99 to about 1% by weight of a polyester segment which is at least one selected from polyester segments of the following general formulas:

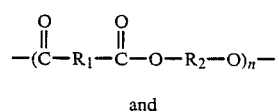

and

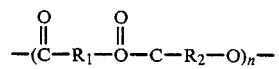

where $R_1$ is at least one radical selected from the group consisting of aromatic bivalent radicals having 6 to 12 carbon atoms and aliphatic bivalent radicals having 4 to 20 carbon atoms, $R_2$ is at least one radical selected from the group consisting of aromatic bivalent radicals having 6 to 20 carbon atoms, and aliphatic bivalent radicals having 2 to 20 carbon atoms, and n is an integer between 1 and 1000.

A silicon oil having terminal reactive epoxy groups is employed in forming the siloxane segments as described above. More particularly, the silicon oil is of the following general formula:

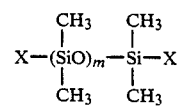

where X is an epoxy moiety selected from the group consisting of

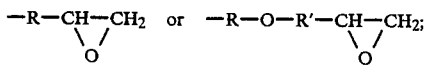

m is an integer between 1 to 2000 (more preferably 5 to 500), and R and R', which may be the same or different, are each hydrocarbon moieties having 1 to 10 carbon atoms.

Preferably, the polyester segment is formed from a "skeleton" polyester compound having an inherent viscosity of not greater than 1.4 dl/g or an oligomer thereof, or monomers capable of forming an ester linkage. The preferred polyester segment employed in this invention will have a 6 carbon atom bivalent radical as $R_1$, and an aliphatic bivalent radical having 2 to 20 carbon atoms preferably 2 to 4 carbon atoms, and still more preferably 4 carbon atoms, as $R_2$.

As mentioned, the polyester segment according to the general formulas above is supplied in the form of a polymer having a skeleton arrangement thereof, an oligomer thereof, and/or monomers capable of forming an ester linkage, and is copolymerized with a siloxane compound expressed by the general formulas above in a specific ratio. The polymer used as the compound for forming the polyester segment is preferably of a relatively low polymerization degree from the standpoint of its reactivity with the siloxane compound, for example, one having a degree of polymerization of not greater than 50.

The term "monomers" as used herein is meant to refer to compounds capable of forming an ester linkage or a combination thereof. That is, one or more kinds of compounds selected from the compounds expressed respectively by $X'-R_1'-X'$; $X'-R_1-Y'$; $X'-R_2-Y'$; and $Y'-R_2-Y'$, where $R_1$ and $R_2$ are as above defined, X' is —COOH, —COOR', or COCl, and Y' is —OH or —O—COR, with R and R' being a hydrocarbon moiety of 1 to 10 carbon atoms.

More specifically, the monomers may be a combination of one or more kinds of dibasic compounds selected from the group consisting of terephthalic acid and derivatives thereof, and aliphatic dicarboxylic acids having 4 to 12 carbon atoms and derivatives thereof, and one or more kinds of diol compounds selected from the group consisting of bisphenols having not more than 20 carbon atoms and derivatives thereof, and aliphatic glycols having not more than 6 carbon atoms and derivatives thereof. Hydroxy carboxylic acids, such as hydroxybenzoic acid may be specifically employed. Preferred examples of such monomers are terephthalic acid and derivatives thereof, and aliphatic glycols having 2 to 4 carbon atoms.

The term "derivative" is meant to refer to any compound which is chemically equivalent to its base compound, for example, hydroxy esters or carboxylic acid, carboxylic acid chloride, and halogen-, methoxy-, alkyl-, alkyl-substituted compounds of the base compound may be specifically mentioned.

The proportion of the siloxane segment in the copolymers of the present invention is between 1 to 99% by weight, preferably 5 to 75% by weight, and most preferably 5 to 50% by weight. In such silicon-containing copolymer, the polymerization degree of the siloxane segment is normally 1 to 2000, preferably 5 to 500, and the polymerization degree of the polyester segment is between 1 to 1000, preferably 1 to 50.

The block copolymers of the present invention may be produced by any known ester exchange technique. For example, one such technique is to react the silicon oil of the general formula as described above with monomers capable of forming an ester linkage. Another technique is to react the silicon oil with the polyester or a prepolymer or oligomer thereof.

According to the former technique, a silicon oil having terminal reactive epoxy moieties is added to a combination of terephthalic acid or a derivative thereof and alkylene glycol or the like and the mixture is heated to about 150° to 26° C. in the presence of a catalyst so as to produce an esterification or ester exchange reaction. The reaction product is then subjected to polycondensation under reduced pressure while any excess monomers or desorbed components are distilled away, whereby a block copolymer is obtained.

The preferred catalysts to produce the block copolymers of this invention include phosphates, and halide derivatives thereof.

According to the latter technique, the silicon oil having terminal reactive epoxy moieties is added to a previously prepared polyalkylene terephthalate prepolymer or the like and the mixture is heated to about 200° to 280° C. with or without the presence of a catalyst so that the terminal functional groups of the prepolymer or any functional groups produced as a result of the decomposition of the prepolymer bond with the reactive radicals of the silicon oil, whereby a block copolymer is obtained.

The silicon-containing copolymer of the invention thus obtained has excellent mechanical strength characteristics, such as tensile strength, tear strength, impact resilience, freeze resistance, and flex resistance, since the siloxane segment and the polyester segment are united together through covalent linkage. The copolymer is provided with good resistance to impact shock and to hydrolysis without any significant loss of the characteristic properties of the base polymer. It is highly useful for various applications, such as automobile and electric and electronic parts, which involve use under severe environmental conditions.

EXAMPLES

Further aspects and advantages of the present invention will be gained by a careful review of the following nonlimiting Examples.

In the following Examples, reference will be made to silicone oils having the formulas C-1, C-2, C-3 and C-4. These formulas are noted below:

Formula C-1:

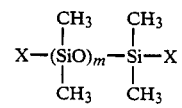

where each X is

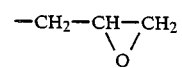

and n is about 70.

Formula C-2:

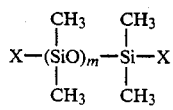

where each X is

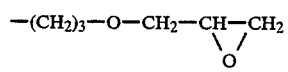

and n is about 23.

Formula C-3:

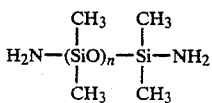

where n is about 10.

Formula C-4:

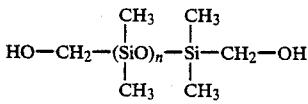

where n is about 25.

Example 1

95 parts by weight of polybutylene terephthalate having an inherent viscosity of 0.7 dl/g was mixed with 5 parts by weight of a reactive silicone oil having the formula C-1 and 0.05 parts by weight of ethyl-triphenyl-phosphonium chloride as a catalyst. The reaction mixture was heated to 260° C. at a reduced pressure for 15 minutes to obtain a block copolymer having a weight ratio of polybutylene terephthalate units to siloxane units of 95/5 and a melting point of 223° C.

Example 2

The reaction was conducted in the same way as described in Example 1 above, except that 90 parts by weight of the polybutylene terephthalate and 10 parts by weight of the silicone oil were used and the reaction was continued for 20 minutes. The obtained copolymer was found to have a weight ratio of polybutylene terephthalate units to siloxane units of 90/10 and a melting point of 222° C.

Example 3

The reaction was carried out in the same manner as described in Example 1 above, except that a silicone oil having the formula C-2 was used. The obtained copolymer was found to have a weight ratio of polybutylene terephthalate units to siloxane units of 95/5 and a melting point of 223° C.

Example 4

The reaction was effected in the same way as described in Example 1 above, except that 90 parts by weight of the polybutylene terephthalate and 10 parts by weight of the silicone oil having the formula C-2 were used and the reaction was continued for 20 minutes. The obtained copolymer was found to have a weight ratio of polybutylene terephthalate units to siloxane units of 90/10 and a melting point of 222° C.

Comparative Example I

The reaction of Example 2 was followed, except that the silicone oil was replaced by one having the formula C-3. It was found, however, that part of the silicone oil remained unreacted, and was extracted with n-hexane. The obtained copolymer was found to have a weight ratio of polybutylene terephthalate units to siloxane units of 92/8 and a melting point of 223° C.

Comparative Example II

The reaction of Example 2 was followed, except that the silicone oil was replaced by one having the formula C-4 and a number-average molecular weight of 2,000. It was found, however, that little reaction occurred. The unreacted silicone oil was removed by extraction with n-hexane. The obtained polymer was found to contain 1 percent by weight by analysis on 1H-NMR.

The polymers obtained in Examples 1-4 and Comparative Examples --II were each molded via injection molding into test pieces and these test pieces were each examined to determine its tensile properties, impact resistance and hydrolysis resistance. The results are shown in Table I below. Tests and measurements were made according to the following methods:

(1) Tensile properties: ASTM D638 was followed mutatis mutandis.

(2) Izod Impact resistance test: ASTM D256 was followed mutatis mutandis.

(3) Hydrolysis resistance test: Each test piece was steeped in hot water at 90° C. for 20 days. Thereafter, the test piece was subjected to drying at 100° C. for 2 hours. The retained tensile strength at breakage of the test piece was measured.

The Izod Impact Test shows the product's improved resistance to impact shock, whereas the hydrolysis resistance test shows the product's resistance to water at elevated temperatures.

TABLE I

|  | Example No. |  |  |  | Comparative Example No. |  |
|---|---|---|---|---|---|---|
|  | 1 | 2 | 3 | 4 | I | II |
| monomer ratio |  |  |  |  |  |  |
| PBT units | 95 | 90 | 95 | 90 | 92 | 99 |
| type of silicone oil | C-1 | C-1 | C-2 | C-2 | C-3 | C-4 |
| siloxane units | 5 | 10 | 5 | 10 | 8 | 1 |
| melting point (°C.) | 223 | 222 | 223 | 222 | 223 | 225 |
| tensile property |  |  |  |  |  |  |
| break strength (kg/cm2) | 620 | 650 | 630 | 610 | 540 | 540 |
| breaking extension (%) | 320 | 320 | 450 | 320 | 40 | 25 |
| Izod impact strength (kg/cm2) | 5.7 | 6.6 | 5.4 | 6.4 | 3.9 | 2.7 |
| hydrolysis resistance | 78 | 84 | 78 | 86 | 80 | 60 |

While the invention has been described in connection with what is presently considered to be the most practical and preferred embodiment, it is to be understood that the invention is not to be limited to the disclosed embodiment, but on the contrary, is intended to cover various modifications and equivalent compounds and methods included within the spirit and scope of the appended claims.

What is claimed is:

1. A silicon-containing copolyester in the form of a block copolymer which consists essentially of:
   (i) between about 1 to 99% by weight of a siloxane segment which is at least one selected from the group consisting of siloxane segments expressed by the following general formulas:

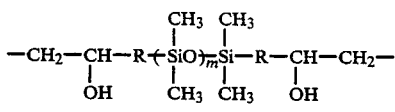

and

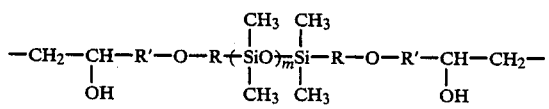

where R and R', which may be the same or different, are each hydrocarbon moieties having 1 to 10 carbon atoms, and m is an integer between 1 to 2000; and
   (ii) between about 99 to about 1% by weight of a polyester segment which is at least one selected from polyester segments of the following general formulas:

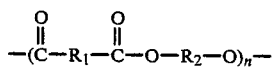

and

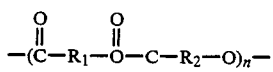

where $R_1$ is at least one radical selected from the group consisting of aromatic bivalent radicals having 6 to 12 carbon atoms and aliphatic bivalent radicals having 4 to 20 carbon atoms, $R_2$ is at least one radical selected from the group consisting of aromatic bivalent radicals having 6 to 20 carbon atoms, and aliphatic bivalent radicals having 2 to 20 carbon atoms, and n is an integer between 1 and 1000.

2. A copolyester as set forth in claim 1, wherein $R_1$ is an aromatic bivalent radical having 6 carbon atoms and $R_2$ is an aliphatic bivalent radical having 2 to 20 carbon atoms.

3. A copolyester as set forth in claim 2, wherein $R_2$ is an aliphatic bivalent radical having 2 to 4 carbon atoms.

4. A copolyester as set forth in claim 3, wherein $R_2$ is an aliphatic bivalent radical having 4 carbon atoms.

5. A copolyester as set forth in anyone of claims 1 to 4, wherein the polymerization degree of the siloxane segment is 5–500 and the polymerization degree of the polyester segment is 1–50.

6. A copolyester as set forth in any one of claims 1 to 4, wherein the proportion of the siloxane segment is 5 to 75% by weight and the proportion of the polyester segment is 95 25% by weight.

7. A block copolyester which is the reaction product of (i) a polyester having an inherent viscosity of not greater than 1.4 dl/g or an oligomer thereof, or monomers capable of forming an ester linkage, and (ii) a silicon oil of the general formula:

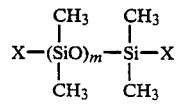

where X is an epoxy moiety selected from the group consisting of

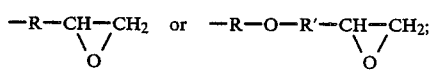

m is an integer between 1 to 2000, and R and R', which may be the same or different, are each hydrocarbon moieties having 1 to 10 carbon atoms.

8. A block copolyester as in claim 7, wherein m is an integer between 5 and 50.

9. A method of producing a silicon-containing copolyester in the form of a block copolymer which consists essentially of:
   (i) between about 1 to 99% by weight of a siloxane segment which is at least one selected from the group consisting of siloxane segments expressed by the following general formulas:

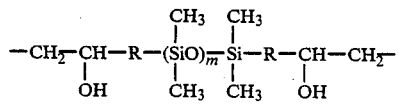

and

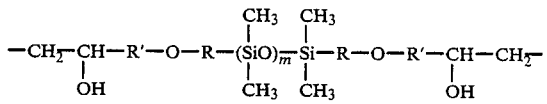

where R and R', which may be the same or different, are each hydrocarbon moieties having 1 to 10 carbon atoms, and m is an integer between 1 to 2000; and
   (ii) between about 99 to about 1% by weight of a polyester segment which is at least one selected from polyester segments of the following general formulas:

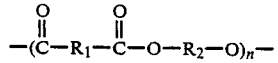

and

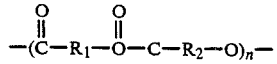

$R_1$ is at least one radical selected from the group consisting of aromatic bivalent radicals having 6 to 12 carbon atoms and aliphatic bivalent radicals having 4 to 20 carbon atoms, $R_2$ is at least one radical selected from the group consisting of aromatic bivalent radicals having 6 to 20 carbon atoms, and aliphatic bivalent radicals having 2 to 20 carbon atoms, and n is an integer between 1 and 1000, which method comprises reacting under copolyester forming conditions:
   (i) a polyester having an inherent viscosity of not greater than 1.4 dl/g or an oligomer thereof, or monomers capable of forming an ester linkage, and (ii) a silicon oil of the general formula:

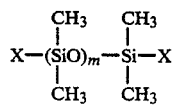

where X is an epoxy moiety selected from the group consisting of

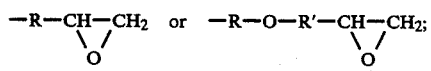

m is an integer between 1 to 2000, and R and R', which may be the same or different, are each hydrocarbon moieties having 1 to 10 carbon atoms.

10. A method as in claim 9, wherein m is an integer between 5 and 50.

11. A method as set forth in claim 9, wherein the monomers capable of forming an ester linkage are one or more kinds of dibasic acid compounds selected from the group consisting of terephthalic acid or derivatives thereof, isophthalic acid or derivatives thereof, and aliphatic dicarboxylic acids having 4 to 12 carbon atoms or derivatives thereof, and one or more kinds of diol compounds selected from the group consisting of bisphenols having not more than 20 carbon atoms or derivatives thereof and aliphatic glycols having not more than 6 carbon atoms or derivatives thereof.

12. A method as set forth in claim 11, wherein the monomer compounds capable of forming an ester linkage and the terminal reactive silicone oil are mixed in a wt % ratio of 1 to 99:99 to 1 and the mixture is heated between 150° to 260° C. in the presence of a catalyst to effect an esterification reaction, the reaction product then being subjected to polycondensation reaction under reduced pressure while any excess monomers or desorbed components are distilled away.

13. A method as set forth in claim 9, wherein the oligomer is a polyalkylene terephthalate prepolymer.

14. A method as set forth in claim 13, wherein the polyalkylene terephthalate prepolymer and the terminal reactive silicone oil are mixed in a wt % ratio of 1 to 99:99 to 1, the mixture being heated to between about 200° C. to 280° C. in the presence of a reaction catalyst to produce the block copolymer.

* * * * *

UNITED STATES PATENT AND TRADEMARK OFFICE
CERTIFICATE OF CORRECTION

PATENT NO. : 4,927,895

DATED : May 22, 1990

INVENTOR(S) : Nakane et al

It is certified that error appears in the above-identified patent and that said Letters Patent is hereby corrected as shown below:

On TITLE PAGE: Abstract, line 1, change "copolyester" to --copolyesters-- and after "of" delete "a";

Column 6, line 23, change "--II" to --I-II--.

Column 7, line 4 of Claim 6, after "95" insert --to--.

Signed and Sealed this

Fourteenth Day of January, 1992

Attest:

HARRY F. MANBECK, JR.

Attesting Officer

Commissioner of Patents and Trademarks